US006966744B1

(12) United States Patent
Cho

(10) Patent No.: US 6,966,744 B1
(45) Date of Patent: Nov. 22, 2005

(54) MULTI STACKER FOR HANDLER

(75) Inventor: Jae Hyuk Cho, Kyungki-do (KR)

(73) Assignee: Mirae Corporation, Choongchungnam-do (KR)

(*) Notice: Subject to any disclaimer, the term of this patent is extended or adjusted under 35 U.S.C. 154(b) by 0 days.

(21) Appl. No.: 09/433,380

(22) Filed: Nov. 3, 1999

(30) Foreign Application Priority Data

Nov. 6, 1998 (KR) .............................. 1998-47608

(51) Int. Cl.[7] ............................................ B65G 57/30
(52) U.S. Cl. ................................................ 414/795.3
(58) Field of Search ..................................... 414/795.3

(56) References Cited

U.S. PATENT DOCUMENTS 2,224,606 A * 12/1940 Neckel ................ 414/795.3 X
3,421,638 A * 1/1969 Locke et al. ......... 414/795.3 X
4,808,057 A * 2/1989 Chiappe et al. ...... 414/795.3 X
5,415,519 A * 5/1995 Lee et al. ................ 414/795.3
5,518,361 A * 5/1996 Smith ...................... 414/795.3
5,906,472 A * 5/1999 Nakamura ............... 414/798.1
6,227,373 B1 * 5/2001 Stuckey et al. .............. 209/3.1
6,234,321 B1 * 5/2001 O'Connor et al. .......... 209/539
6,241,459 B1 * 6/2001 Canella et al. ....... 414/795.3 X
6,397,567 B1 * 6/2002 Focke et al. .................. 53/541
6,524,052 B1 * 2/2003 Yamauchi et al. ....... 414/331.1

FOREIGN PATENT DOCUMENTS

JP 63-315422 * 12/1998 .............. 414/795.3

* cited by examiner

*Primary Examiner*—Douglas Hess
(74) *Attorney, Agent, or Firm*—Fleshner-Kim, LLP

(57) ABSTRACT

A multi-stacker for a handler is provided. After a device positioned in a test tray is tested at a test site and is classified, each test tray is unloaded according to the classification. The multi-stacker for a handler includes a stacker frame installed longitudinally on a handler frame and coupled to a side plate, a tray stacking portion for stacking a test tray loaded with a classified device in the stacker frame, and a guide for determining a position of a test tray placed on the tray plate and installed at four edges of the tray plates so as to prevent the tray plate from deviating from a predetermined position. As the tray is moved up and down along an inside of the guide, the test tray holding a classified device may be unloaded.

18 Claims, 7 Drawing Sheets

MULTI STACKER FOR HANDLER

BACKGROUND OF THE INVENTION

1. Field of the Invention

The present invention relates to a multi-stacker for a handler for classifying and stacking a test tray served with a device tested by a tester. More particularly, the present invention relates to a multi-stacker for a handler in which, after a device served in a test tray is tested at a test site and is classified, each test tray is unloaded according to the classification.

2. Description of the Prior Art

In general, a device produced by a manufacturing process is, in regular sequence, fed by an elevator of a horizontal or vertical handler to a tester to be tested. As the result of testing, good devices are separated from bad devices so that only good devices are outputted.

A device, whose performance is to be tested, is moved to a test position in a test tray and is contacted with a tester. At this time, the tested device is classified according to a classification and the classified device is again classified as it is unloaded by a multi-stacker.

As shown, in FIGS. 1 and 2, a conventional handler frame 10 includes, at the upper portion thereof, an unloading base plate, which is secured to the conventional handler frame 10 by a plurality of mounting brackets 108. The unloading base plate 104 extends longitudinally with a long-hole 106 formed therein extending perpendicularly to the handler frame 10. One end of a plurality of tray plates 110 are inserted into the long hole 106 of the unloading base plate 104 in regular sequence.

Each tray plate 110 is provided with a plurality of pins 118 so that the test tray 110 is correctly placed thereon. The tray plate 110, at one side thereof, includes a tray guide 116.

The tray plate 110 is, at a lower portion thereof, provided further with a belt bracket 120 which is moved up and down by a belt (not shown). A pulley bracket 122 includes a shaft 126 coupled with a pulley 124, which is moved by a motor. The pulley 124 coupled to the shaft 126 is rotated according to the rotation of the motor so that the belt (not shown) wound around the pulley 124 is rotated to move the belt bracket 120 up and down. Accordingly, the plurality of tray plates 110 are moved up and down.

A stopper base 128 is installed at a lower portion of the pulley bracket 122. The stopper base 128 is, at a right side portion thereof, provided with a cylinder 132. A stopper 130 is connected to the lower end of the cylinder 132.

The "⌉"-shaped stopper 130 is, on a left end thereof, formed with a PAW to control a rising height when the plurality of tray plates 110 are moved in an upward direction. The stopper 130 is, at a central portion thereof, secured by a hinge and can be moved up and down by the cylinder 132.

The multi-stacker having the above-construction is provided with a plurality of tray plates positioned at predetermined intervals, thereby causing an increase in the required space. Further, because the position of the multi-stacker is controlled by the cylinder, the apparatus has a complicated construction. Furthermore, it is very difficult to stack the classified device and the classification of the device can not be varied.

SUMMARY OF THE INVENTION

Accordingly, the present invention has been invented to solve the above problems. It is an object to provide a multi-stacker of a handler, in which a stacker is simplified in construction and is small in size, to stack a test tray served with variously classified devices so that correct and rapid stacking operations can be accomplished.

To accomplish above object, the present invention provides a multi-stacker of a handler comprising: a stacker frame installed longitudinally on a handler frame and coupled with a side plate; a tray stacking portion for stacking a test tray served with a classified distributed device in the stacker frame; a guide for determining the position of a test tray placed on a tray plate and provided at four edges of the test tray for preventing the tray plate from deviating from a predetermined position; and a tray up/down movement means for moving up and down along the inside of the guide and for unloading the test tray which has been served with a classified device.

The stacker frame is, at a lower portion thereof, provided with a support plate. The support plate is, at an inside of the lower portion thereof, provided with a stopper configured to move transversely.

The stopper moves transversely by means of a linear cylinder provided at an upper portion thereof. The stopper is, on an entire surface thereof, formed with a protrusion to fix the tray plate.

The tray stacking portion includes a plurality of tray plates to classify and stack test trays served with the classified devices.

The tray up/down movement means comprises an up/down movement plate having a plurality of tray plates positioned thereon, a linear motion (LM) rail secured at one side to a rack and installed longitudinally at a lower portion of the up/down movement plate, a LM block installed longitudinally slidable along the LM rail; a bracket secured to one side of the LM block and secured to a lower portion of the handler frame, a motor provided with a pinion gear for moving up and down the up/down movement plate via a rack of the LM rail, and a bracket attached to the motor for rotating the pinion gear.

The up/down movement plate is, at a lower portion thereof, connected to a top side of the LM rail and is provided with a support plate for attenuating distortion and vibration of the up/down movement plate. The LM rail is, at a lower portion thereof, provided with a pair of support plates for attenuating the shock and vibration of the LM rail. The guide moves transversely by means of the linear cylinder for easy control of the test tray.

BRIEF DESCRIPTION OF THE DRAWING

Other objects and aspects of the invention will become apparent from the following description of embodiments with reference to the accompanying drawings in which.

DETAILED DESCRIPTION OF THE PREFERRED EMBODIMENT

Figure 1:
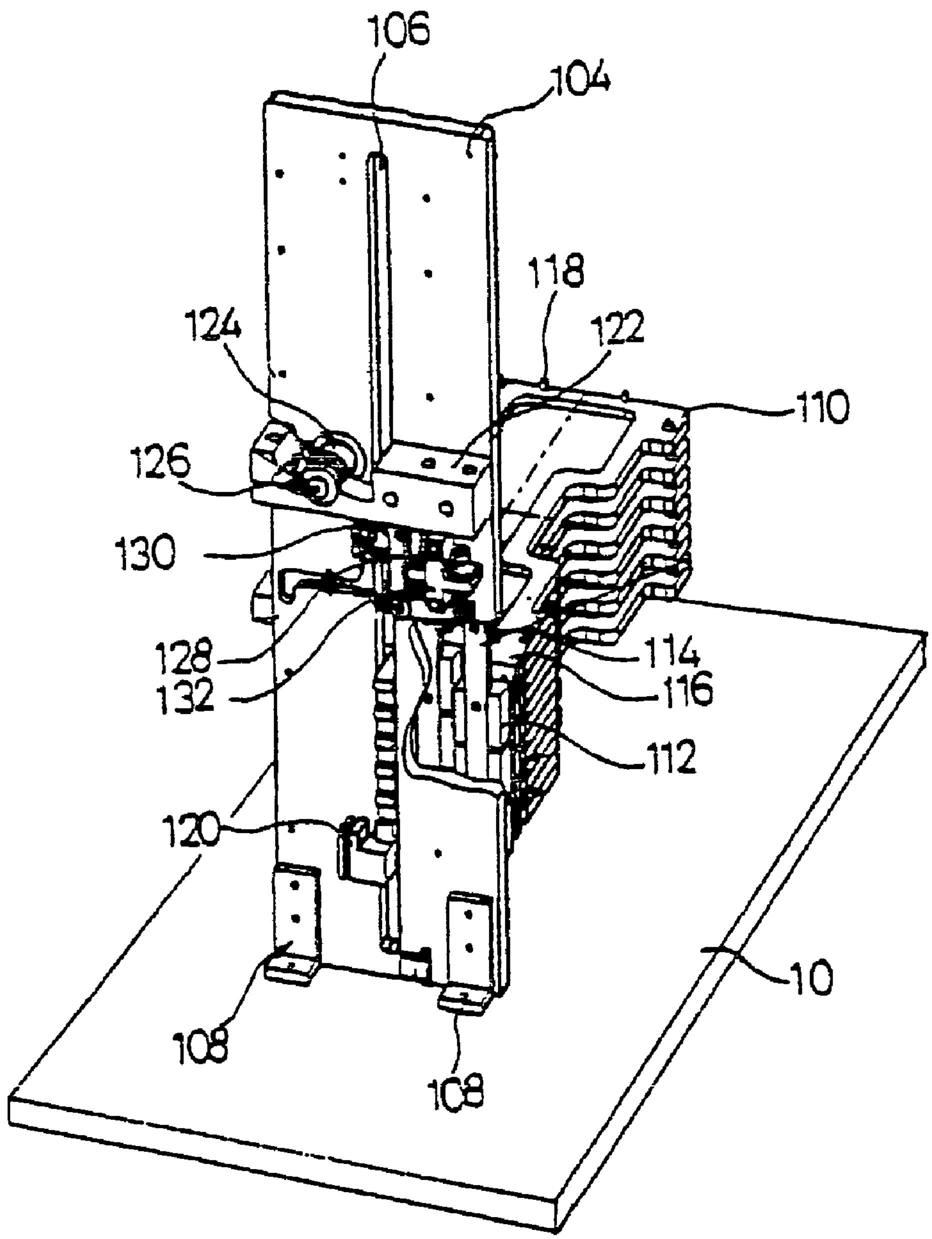
FIG. 1 is a perspective view of a conventional multi-stacker for a handler.
Figure 2:
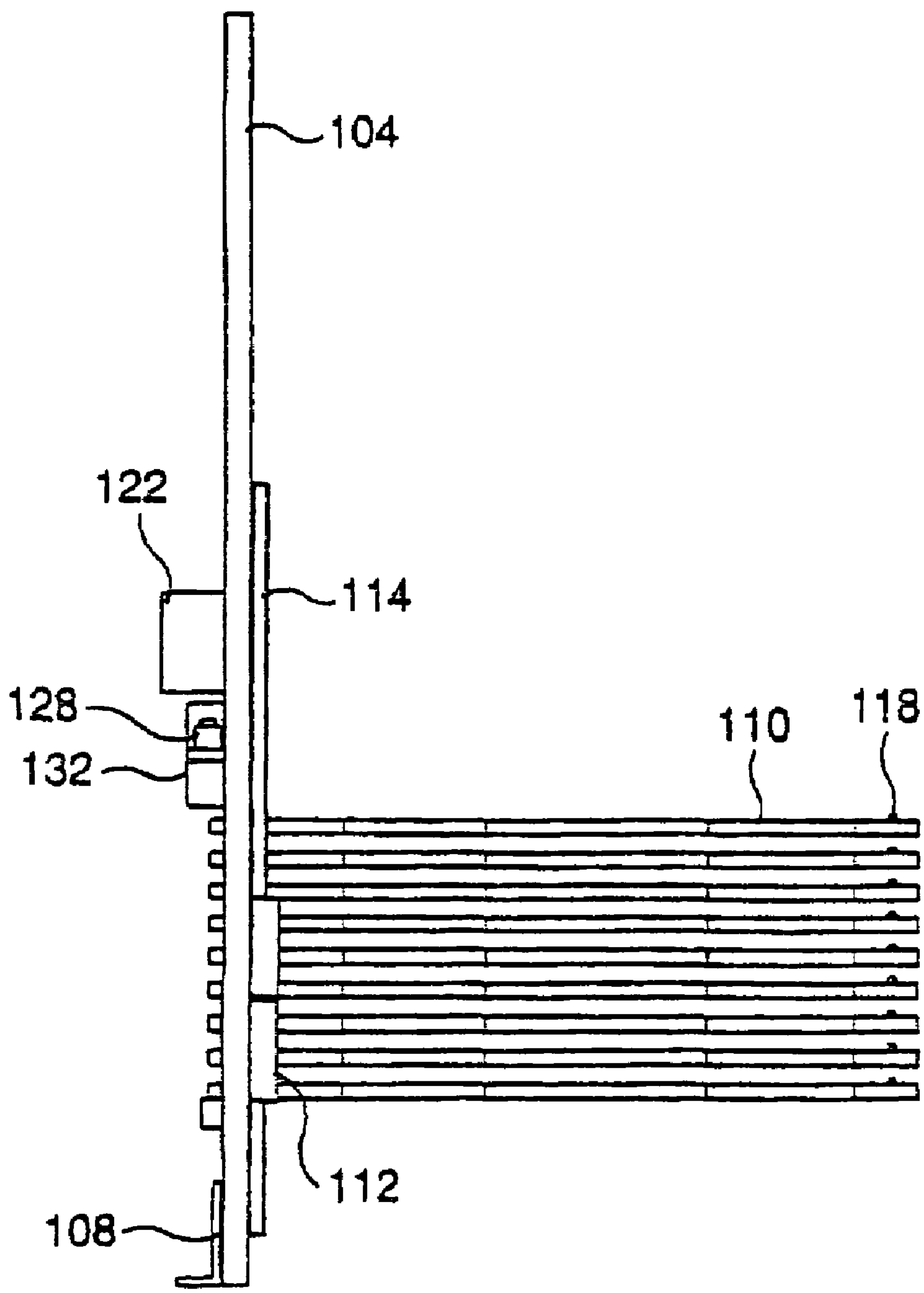
FIG. 2 is a side view of the conventional multi-stacker of FIG. 1.
Figure 3:
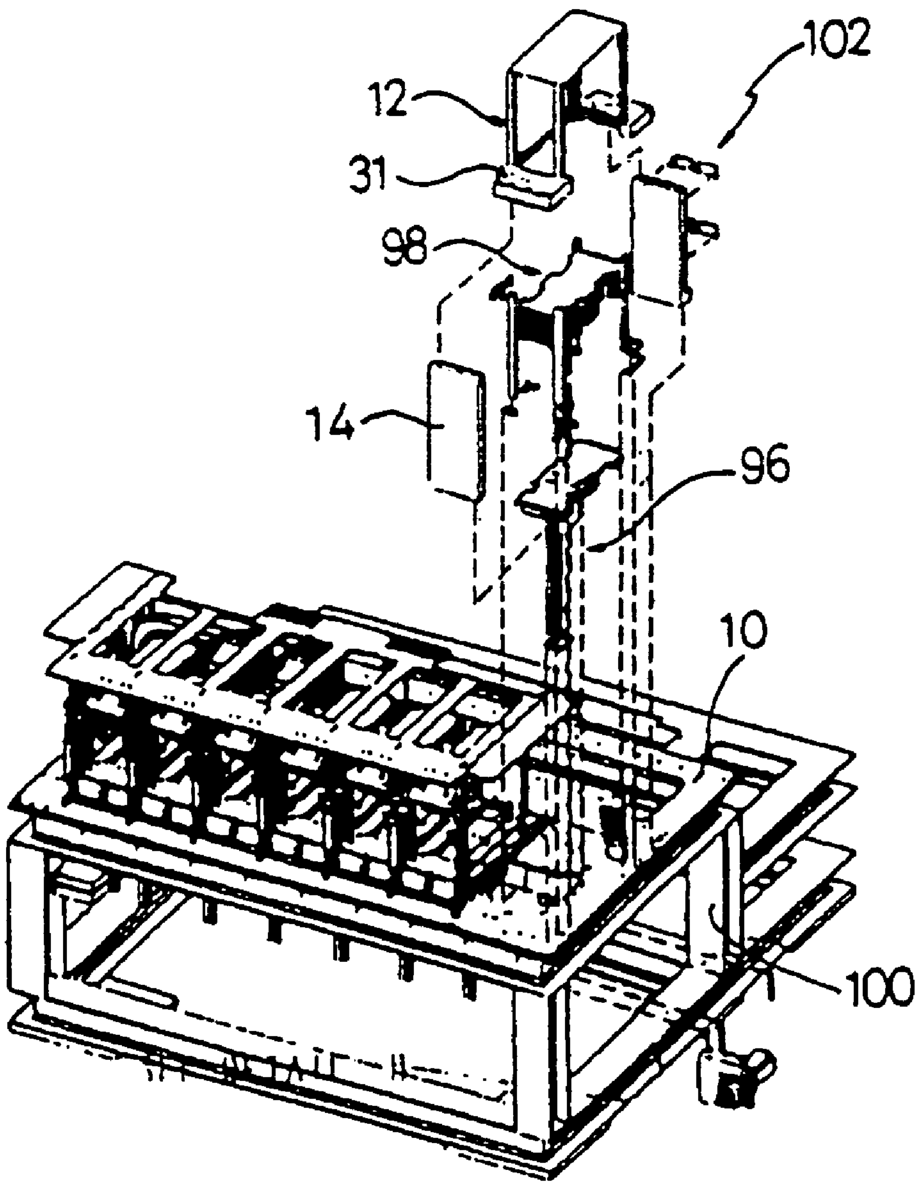
FIG. 3 is a perspective view of a multi-stacker for a handler according to the present invention.
Figure 4:
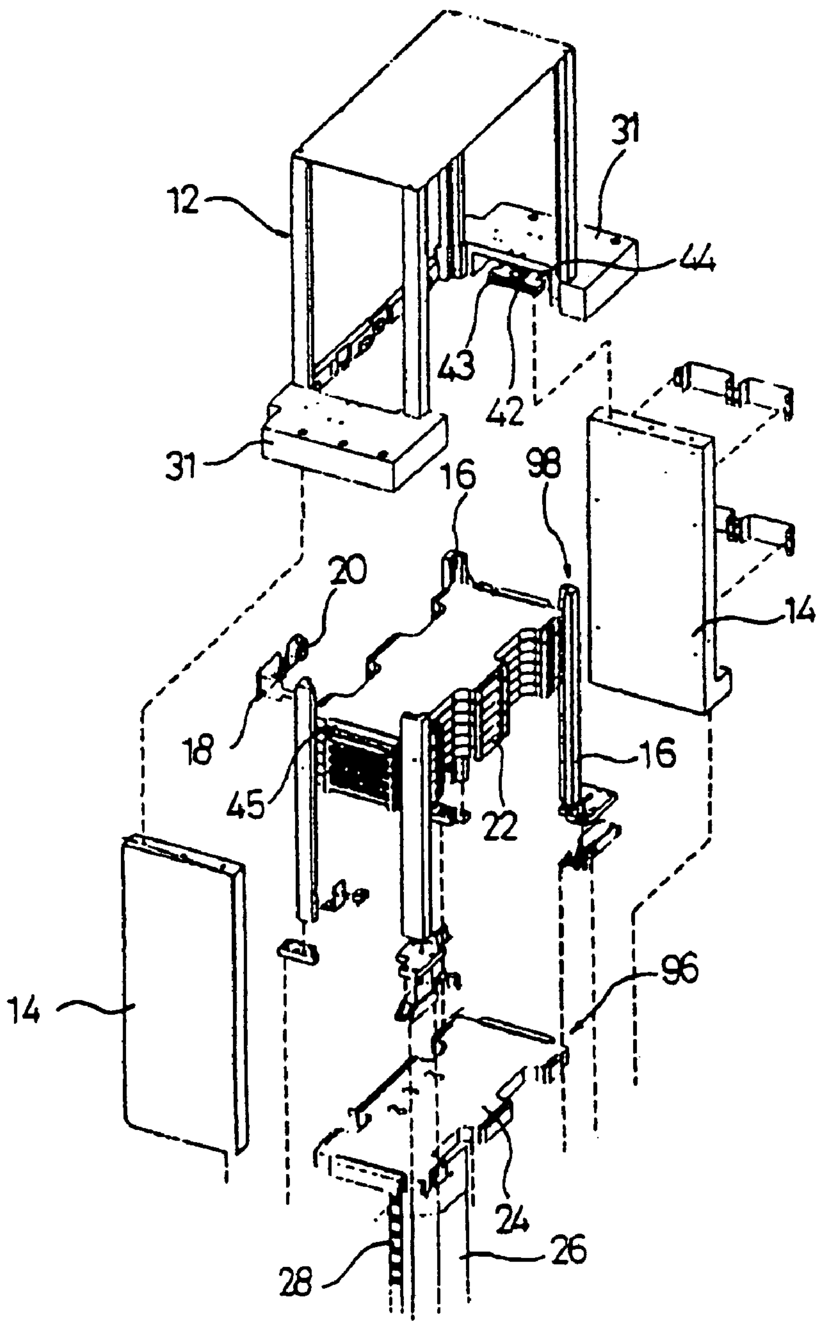
FIG. 4 is a disassembly perspective view of the multi-stacker for a handler of FIG. 3.
Figure 5:
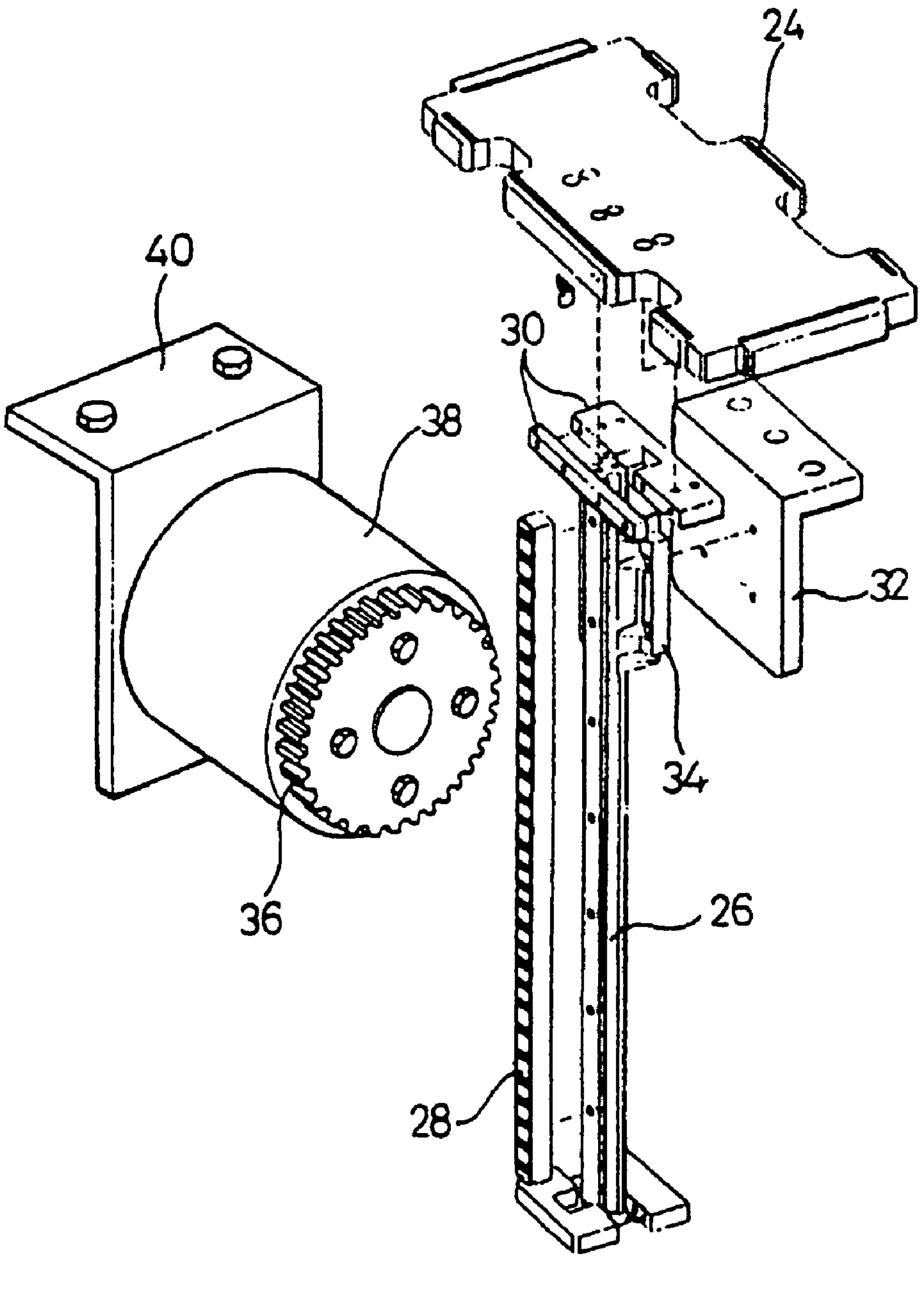
FIG. 5 is a perspective view of an up/down movement means of a multi-stacker for a handler according to the present invention.
Figure 6:
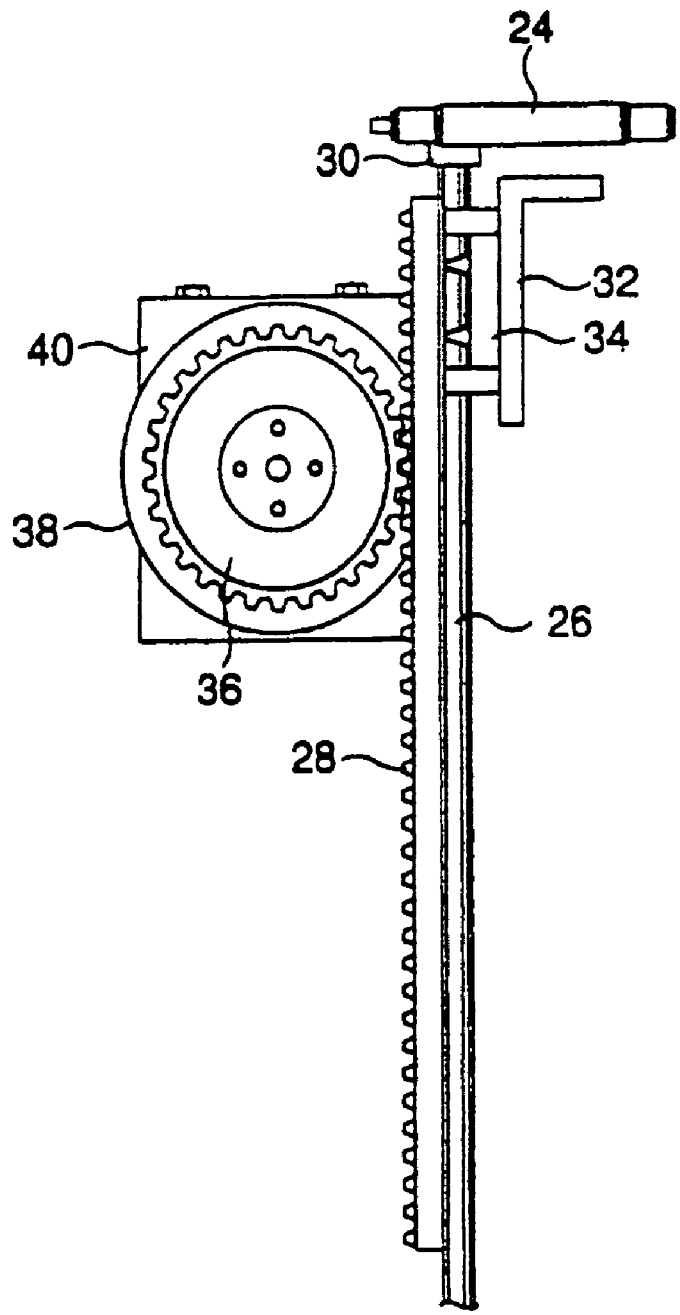
FIG. 6 is a side view of the up/down movement means of FIG. 5.
Figure 7:
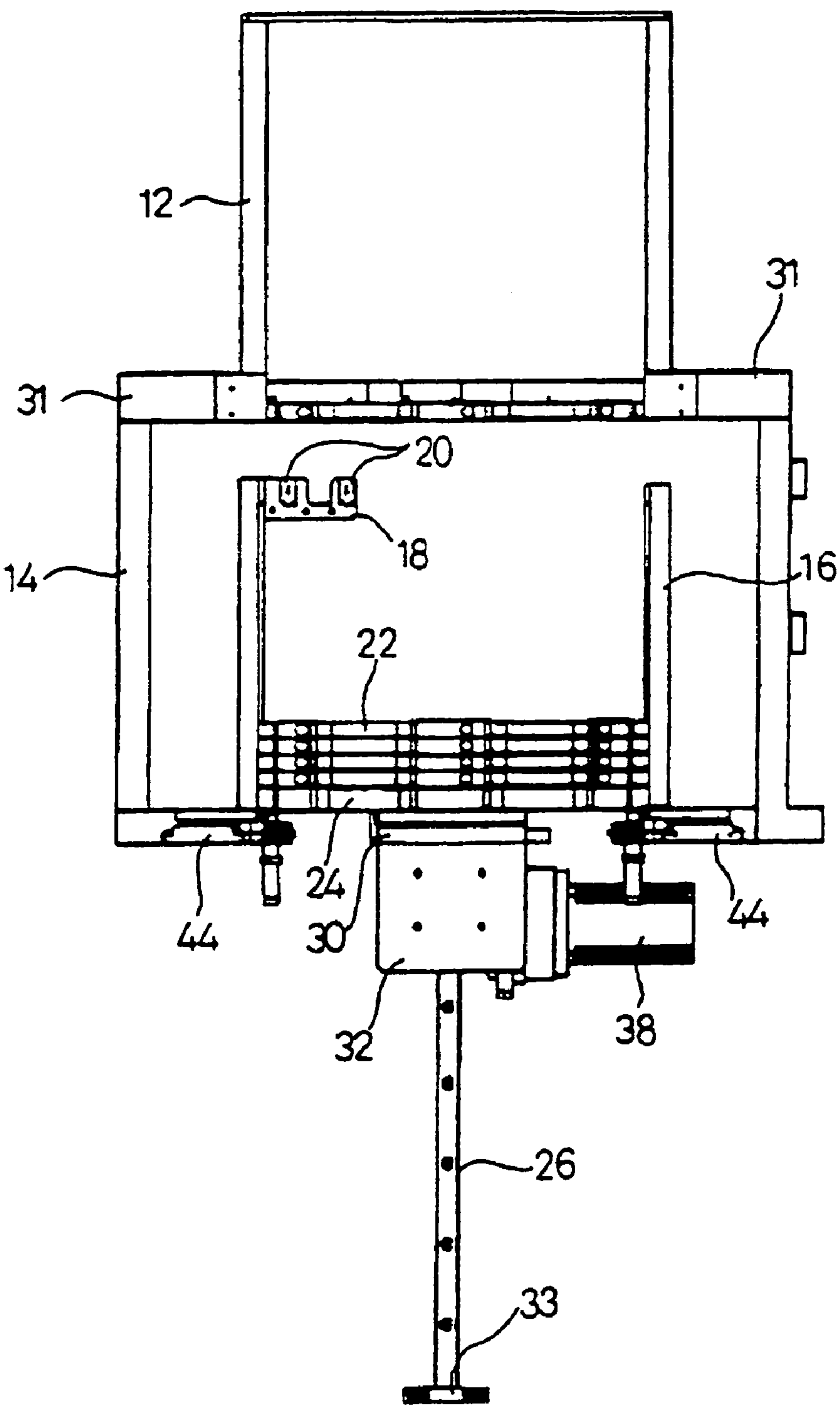
FIG. 7 is a side view for the construction of the multi-stacker for a handler according to the present invention.

FIG. 3 is a perspective view of a disassembled multi-stacker for a handler according to the present invention. FIG. 4 is also a disassembled perspective view of the multi-stacker for a handler of FIG. 3. FIG. 5 is a perspective view of an up/down movement device or means of a multi-stacker for a handler according to the present invention. FIG. 6 is a side view of the up/down movement means of FIG. 5. FIG. 7 is a side view of the multi- stacker according to the present invention.

Referring to FIGS. 3 to 7, a multi-stacker for a handler according to the present invention comprises a stacker frame 12 installed longitudinally on a handler frame 10 and coupled to side plates 14, and a tray stacking portion 98 for classifying and stacking a plurality of test trays, each of which is served with devices classified according to a classification. Guides 16 maintain a position of tray plates 22 and are positioned at four edges of the tray plates 22 to prevent the tray plates 22 from deviating out of a correct position. A tray up/down movement means 96 is configured to move up and down along an inside of the guides 16 for unloading a test tray served with a classified device.

The stacker frame 12 is, at a lower portion thereof, provided with a support plate 31. The support plate 31 is, at an inside of a lower portion thereof, provided with a stopper 42 configured to move transversely by the action of a linear cylinder 44 provided at an upper portion thereof. The stopper 42 is, on an entire surface thereof, formed with a protrusion to hold the tray plate 22.

The tray stacking portion 98 includes the plurality of tray plates 22 configured to stack classified devices. The tray up/down movement means 96 comprises an up/down movement plate 24 on which the plurality of tray plates 22 are stacked; a LM rail 26 having a rack 28 secured at one side thereof and installed longitudinally on a lower portion of the up/down movement plate 24; a LM block 34 installed for sliding longitudinally along the LM rail 26; a bracket 32 secured to one side of the LM block 34 and secured to a lower portion of the handler frame 10; a motor 38 provided with a pinion gear 36 for moving the up/down movement plate 24 up and down, pinion gear 36 being engaged with the rack 28 of the LM rail 26; and a bracket 40 connected to the motor 38 for rotating the pinion gear 36.

The up/down movement plate 24 is, at a lower portion thereof, connected with a top side of the LM rail 26 and is provided with the support plate 30 for reducing distortion and vibration of the up/down movement plate 24. The LM rail 26 is, at a lower end thereof, provided with a pair of support plates 33 for reducing shock and vibration of the LM rail 26.

A more detailed description of the multi-stacker having the above construction follows.

The base 100 of the handler has a square-shaped frame. A handler frame 10 is positioned on an upper portion thereof.

The handler frame 10 is, at a right upper portion thereof, provided with the multi-stacker 102. The multi-stacker 102 serves to classify and stack each test tray served with a classified device after testing.

The stacker frame 12 of the multi-stacker 102 has a four sided-opened box shape and is, at right and left sides thereof, provided with a pair of support plates 31. The support plates 31 are, at a lower portion thereof, provided with a stopper 42 for stopping the ascending tray plates 22.

Furthermore, the stopper 42 is, on an entire surface thereof, provided with a protrusion 43 and is, at an upper portion thereof, connected to a linear cylinder 44 which moves the stopper right and left.

Meanwhile, the support plate 31 is, at a lower portion thereof, installed with side plates 14, facing each other from the right and left, and is, at an inside thereof, provided with tray stacking portion 98 for stacking the tray plates 22, which are each formed with a locking groove 45 on both sides.

The tray stacking portion 98 is constructed so that the stacker frame 12 is, at four edges thereof, secured within the guides 16. The sensor 20 is secured by the sensor bracket 18 at one side of the guide 16. Further, the tray stacking portion 98 is constructed so that a plurality of tray plates 22 may be stacked along an inner surface of the guides 16 for up/down movement. The tray stacking portion 98 is, at a lower portion thereof, provided with the tray up/down movement means 96 to support the tray plates 22 and to move up/down for classifying and stacking the test trays served with classified devices.

Furthermore, it is easy to attach or detach the tray plates so that the number of classification levels for stacking the test trays can be changed.

The tray up/down movement means 96 supports the tray plates 22. The up/down movement plate 24 is, at a lower portion thereof, secured with the LM rail 26 and is, at an upper end thereof, provided with the support plate 30 to connect the up/down movement plate 24 to the LM rail 26 and to reduce distortion and vibration of the up/down movement plate 24.

The LM rail 26 is, at one side thereof, secured with the rack 28 formed with a plurality of gears, and is, at the other side thereof, provided with the LM block 34 thereby to move the LM rail 26 up/down. The LM block 34 is secured to the handler frame 10. Further, the LM rail 26 is, at a lower end thereof, provided with a pair of support plates 33 to attenuate vibration and shock of the LM rail 26.

The motor 38 is installed on the bracket 40 secured to the handler frame 10. The pinion gear 36 configured to be rotated by rotating power from the motor 38 is engaged with the rack 28. Accordingly, the rack 28 is moved up/down by the rotation of the pinion gear 36.

The operation of multi-stacker having the above-construction will now be described.

A tested device at a test site is separated according to classification as a good device versus a bad device. When a test tray is served with a classified device, the motor 38 drives the pinion gear 36 to rotate thereby moving the rack 28 up.

At this time, the LM rail 26 secured with the rack 28 is guided by the LM block 34 to move up/down, and, at the same time, the tray plates 22 positioned on the up/down movement plate 24 are moved toward the inside of the stacker frame 12.

The protrusion 43 of the stopper 42 is inserted in and secured to the locking groove of an ascended tray plate 22. Because the stopper 42 is moved forward and backward in the right and left directions by the linear cylinder 44, the linear cylinder 44 operates the stopper 42 to move forward when the tray plate 22 on the up/down movement plate 24 ascends. At this time, the protrusion 43 of the stopper 43 is coupled with the locking groove 45 of the tray plate 22 thereby securing the upper tray plate 22 of the desired tray plate 22 among the classified tray plates 22.

Meanwhile, other tray plates 22 are moved down by a predetermined distance along with the up/down movement plate 24, the test tray is placed on the tray plate 22, and, at the same time, the up/down movement plate 24 again ascends to contact with the tray plate 22 so that the stopper 42 moves backward to release the tray plate 22. Accordingly, the up/down movement plate 24 is moved down with the test tray.

If the test tray is to be served with a level II classified device, the tray plate 22 disposed at the highest portion is secured by the stopper, the test tray is placed on the second tray plate 22 to move down. By repeating the above operations the test tray served with the classified device can be unloaded.

Accordingly, the present invention having the above description simplifies its construction and easily stacks a classified device, as well as sets its position correctly and rapidly.

Having described specific preferred embodiments of the invention with reference to the accompanying drawings, it is to be understood that various changes and modifications may be effected therein by one skilled in the art without departing from the scope or spirit of the invention as defined in the appended claims.

What is claimed is:

1. A multi-stacker for an IC (integrated circuit) handler, comprising:

a stacker frame;

a guide frame positioned below and coupled to a bottom of the stacker frame;

a movement plate configured to move upward and downward within the guide frame;

a plurality of tray plates stacked on the movement plate and configured to move upward and downward within a guide attached to the guide frame and within the stacker frame; and a support portion formed at a lower end portion of the stacker and configured to selectively engage and disengage side end portions of a tray plate of the plurality of tray plates.

2. The multi-stacker of claim 1, wherein the support portion comprises at least one stopper mechanism which is configured to prevent one or more tray plates from being lowered from the stacker frame into the guide frame.

3. The multi-stacker of claim 2, wherein the at least one stopper mechanism comprises:

a blocking protrusion configured to engage a side edge of one of the plurality of tray plates; and an actuator coupled to the blocking protrusion and attached to the stacker frame.

4. The multi-stacker of claim 3, wherein the actuator is configured to move the blocking protrusion into and out of a path of travel of the plurality of tray plates as the plurality of tray plates move from the stacker frame to the guide frame.

5. The multi-stacker of claim 4, wherein the at least one stopper mechanism comprises first and second stopper mechanisms attached to opposite sides of the stacker frame, and wherein the actuator of each stopper mechanism comprises a piston and cylinder.

6. The multi-stacker of claim 1, further comprising an elevator mechanism coupled to the movement plate and configured to move the movement plate upward and downward such that tray plates stacked on the movement plate are moved from the guide frame into and out of the stacker frame.

7. The multi-stacker of claim 6, wherein the elevator mechanism comprises:

a rail that is movably mounted on the multi-stacker and that is connected to the movement plate;

a rack mounted on the rail;

a motor mounted on the multi-stacker adjacent the rail; and a pinion gear mounted on a rotating shaft of the motor, wherein the pinion gear engages the rack mounted on the rail, and wherein rotational movement of the pinion gear causes the rail and the movement plate to move upward and downward.

8. The multi-stacker of claim 7, further comprising a linear movement block mounted on the multi-stacker and configured to guide movement of the rail.

9. The multi-stacker of claim 7, further comprising a support plate connected between the rail and the movement plate and configured to dampen vibrations of the movement plate during movement of the movement plate.

10. The multi-stacker of claim 7, further comprising at least one support plate connected to a lower end of the rail and configured to dampen vibrations of the rail during movement of the rail.

11. The multi-stacker of claim 1, wherein the guide includes four guide rails that are configured to guide corners of the tray plates as the tray plates move upward and downward with the movement plate.

12. The multi-stacker of claim 1, further comprising a sensor configured to determine positions of the plurality of tray plates.

13. A multi-stacker for an IC (integrated circuit) handler, comprising:

a guide frame;

a movement plate configured to move upward and downward within the guide frame;

a plurality of tray plates stacked on the movement plate and configured to move upward and downward within the guide frame, wherein each of the tray plates is configured to receive a tray holding a plurality of semiconductor devices;

at least one stopper mechanism which is configured to selectively engage and disengage with a corresponding side portion of one of the plurality of tray plates so as to prevent one or more tray plates from being lowered as the movement plate moves downward in the guide frame; and an elevator mechanism coupled to the movement plate and configured to move the movement plate upward and downward along the guide frame, wherein the elevator mechanism comprises:

a rail that is movably mounted on the multi-stacker and that is connected to the movement plate;

a rack mounted on the rail;

a motor mounted on the multi-stacker adjacent the rail; and a pinion gear mounted on a rotating shaft of the motor, wherein the pinion gear engages the rack mounted on the rail, and wherein rotational movement of the pinion gear causes the rail and the movement plate to move upward and downward.

14. The multi-stacker of claim 13, wherein the at least one stopper mechanism comprises:

a blocking protrusion configured to engage a side edge of one of the plurality of tray plates; and an actuator coupled to the blocking protrusion and configured to move the blocking protrusion into and out of a path of travel of the plurality of tray plates as the plurality of tray plates move upward and downward.

15. The multi-stacker of claim 13, further comprising a support plate connected between the rail and the movement plate and configured to dampen vibrations of the movement plate during movement of the movement plate.

16. The multi-stacker of claim 13, further comprising at least one support plate connected to a lower end of the rail and configured to dampen vibrations of the rail during movement of the rail.

17. The multi-stacker of claim 13, further comprising a sensor configured to determine positions of the plurality of tray plates.

18. A multi-stacker for an IC (integrated circuit) handler, comprising:

a stacker frame;

a guide frame positioned below and coupled to a bottom of the stacker frame;

a movement plate configured to move upward and downward within the guide frame; and a plurality of tray plates stacked on the movement plate and configured to move upward and downward within a guide attached to the guide frame and within the stacker frame, wherein the guide includes four guide rails that are configured to guide corners of the tray plates as the tray plates move upward and downward with the movement plate.

* * * * *